US012321947B2

(12) United States Patent
Sethi et al.

(10) Patent No.: US 12,321,947 B2
(45) Date of Patent: Jun. 3, 2025

(54) METHOD AND SYSTEM FOR PREDICTING NEXT STEPS FOR CUSTOMER SUPPORT CASES

(71) Applicant: EMC IP Holding Company LLC, Hopkinton, MA (US)

(72) Inventors: Parminder Singh Sethi, Ludhiana (IN); Vasanth DS, Bangalore (IN); Akanksha Goel, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 370 days.

(21) Appl. No.: 17/386,370

(22) Filed: Jul. 27, 2021

(65) Prior Publication Data
US 2022/0398599 A1 Dec. 15, 2022

(30) Foreign Application Priority Data

Jun. 11, 2021 (IN) .............................. 202141026090

(51) Int. Cl.
G06Q 30/01 (2023.01)
G06N 5/04 (2023.01)
(Continued)

(52) U.S. Cl.
CPC ............ G06Q 30/016 (2013.01); G06N 5/04 (2013.01); G06N 20/00 (2019.01); G06Q 10/06316 (2013.01)

(58) Field of Classification Search
CPC ..................................................... G06Q 30/01
See application file for complete search history.

(56) References Cited

U.S. PATENT DOCUMENTS 6,697,962 B1 2/2004 Mccrory
7,698,131 B2 4/2010 Bennett
(Continued)

FOREIGN PATENT DOCUMENTS

CA 2568137 A1 2/2007
CA 2793743 A1 7/2011
(Continued)

OTHER PUBLICATIONS

Walid Maalej, Mathias Ellmanna, Romain Robbes, Using contexts similarity to predict relationships between tasks, The Journal of Systems and Software, Published by Elsevier Inc., 2017. (Year: 2017).*

(Continued)

Primary Examiner — Kurtis Gills
(74) Attorney, Agent, or Firm — Chamberlain, Hrdlicka, White, Williams & Aughtry; Aly Z. Dossa

(57) ABSTRACT

Techniques described herein relate to a method for managing support cases of clients. The method may include obtaining a support case associated with a client of the clients; in response to obtaining the support case, obtaining contextual information associated with the support case; obtaining client telemetry data associated with the support case; selecting a portion of training data that is similar to the support case based on the client telemetry data, the contextual information, and the support case; generating a prediction model using the portion of the training data and a classification algorithm; and
generating predictions using the prediction model, the client telemetry data, the contextual information, and the support case.

18 Claims, 12 Drawing Sheets

(51) Int. Cl.
  *G06N 20/00* (2019.01)
  *G06Q 10/0631* (2023.01)
  *G06Q 30/016* (2023.01)

(56) References Cited

U.S. PATENT DOCUMENTS

| | | | |
|---|---|---|---|
| 7,970,720 B1 | 6/2011 | Heidenreich et al. | |
| 8,577,016 B1 | 11/2013 | Duva et al. | |
| 9,602,560 B1 | 3/2017 | Moody | |
| 9,754,263 B1 | 9/2017 | Apple | |
| 9,922,649 B1 | 3/2018 | Lore et al. | |
| 10,048,996 B1 | 8/2018 | Bell et al. | |
| 10,192,179 B1 | 1/2019 | Agarwal | |
| 10,410,219 B1 | 9/2019 | El-nakib | |
| 10,721,142 B1 | 7/2020 | Mathur et al. | |
| 10,956,822 B1 | 3/2021 | Kern et al. | |
| 11,436,642 B1 | 9/2022 | Podgorny et al. | |
| 11,461,787 B1 | 10/2022 | Riley | |
| 11,561,849 B1 | 1/2023 | Kairali et al. | |
| 2001/0047270 A1 | 11/2001 | Gusick et al. | |
| 2002/0022986 A1 | 2/2002 | Coker et al. | |
| 2003/0041088 A1 | 2/2003 | Wilson | |
| 2004/0162724 A1 | 8/2004 | Hill et al. | |
| 2005/0105712 A1 | 5/2005 | Williams et al. | |
| 2006/0010110 A1* | 1/2006 | Kim | G06Q 40/00 |
| 2006/0080107 A1 | 4/2006 | Hill et al. | |
| 2007/0276631 A1 | 11/2007 | Subramanian et al. | |
| 2008/0152122 A1 | 6/2008 | Idan et al. | |
| 2009/0083246 A1 | 3/2009 | Coker et al. | |
| 2009/0228264 A1 | 9/2009 | Williams et al. | |
| 2010/0050074 A1 | 2/2010 | Nachmani et al. | |
| 2011/0055122 A1 | 3/2011 | Andreoli | |
| 2011/0071869 A1 | 3/2011 | Obrien et al. | |
| 2011/0118932 A1 | 5/2011 | Singh et al. | |
| 2011/0320228 A1 | 12/2011 | Kowalski | |
| 2012/0102371 A1 | 4/2012 | Tonouchi | |
| 2012/0185290 A1 | 7/2012 | Mueller | |
| 2013/0110520 A1 | 5/2013 | Cheyer et al. | |
| 2013/0268260 A1 | 10/2013 | Lundberg et al. | |
| 2014/0067375 A1 | 3/2014 | Wooters | |
| 2014/0281739 A1 | 9/2014 | Tuffs | |
| 2014/0324276 A1 | 10/2014 | Weaks | |
| 2014/0337377 A1 | 11/2014 | De Assuncao et al. | |
| 2014/0344565 A1 | 11/2014 | Wu | |
| 2015/0088784 A1 | 3/2015 | Dhara et al. | |
| 2015/0127322 A1 | 5/2015 | Clark | |
| 2015/0180985 A1 | 6/2015 | Seibert | |
| 2015/0193429 A1 | 7/2015 | Bohra et al. | |
| 2015/0278534 A1 | 10/2015 | Thiyagarajan | |
| 2015/0310445 A1 | 10/2015 | Chan et al. | |
| 2016/0027019 A1 | 1/2016 | Michaelangelo et al. | |
| 2016/0055044 A1 | 2/2016 | Kawai et al. | |
| 2016/0132812 A1 | 5/2016 | Beasley et al. | |
| 2016/0171505 A1 | 6/2016 | Johri et al. | |
| 2016/0179928 A1 | 6/2016 | Alkov et al. | |
| 2016/0371756 A1 | 12/2016 | Yokel | |
| 2017/0011308 A1 | 1/2017 | Sun et al. | |
| 2017/0060995 A1 | 3/2017 | Boule et al. | |
| 2017/0068976 A1 | 3/2017 | Wawrzynowicz | |
| 2017/0109222 A1 | 4/2017 | Singh et al. | |
| 2017/0132060 A1 | 5/2017 | Nomura et al. | |
| 2017/0169325 A1 | 6/2017 | Mccord et al. | |
| 2017/0230312 A1 | 8/2017 | Barrett et al. | |
| 2017/0270419 A1 | 9/2017 | Sánchez et al. | |
| 2018/0007204 A1 | 1/2018 | Klein | |
| 2018/0012231 A1 | 1/2018 | Sapoznik et al. | |
| 2018/0095814 A1 | 4/2018 | Patil | |
| 2018/0129785 A1 | 5/2018 | Pal | |
| 2018/0174020 A1 | 6/2018 | Wu | |
| 2018/0191903 A1 | 7/2018 | Yokel | |
| 2018/0278687 A1 | 9/2018 | Handa | |
| 2018/0285320 A1 | 10/2018 | Yang et al. | |
| 2018/0322509 A1 | 11/2018 | Walthers et al. | |
| 2018/0329768 A1 | 11/2018 | Bikumala et al. | |
| 2018/0349394 A1 | 12/2018 | Hu | |
| 2019/0108270 A1 | 4/2019 | Dunne et al. | |
| 2019/0163594 A1 | 5/2019 | Hayden et al. | |
| 2019/0196682 A1 | 6/2019 | Madafferi | |
| 2019/0228107 A1 | 7/2019 | Trim et al. | |
| 2019/0228296 A1 | 7/2019 | Gefen et al. | |
| 2019/0228315 A1 | 7/2019 | Xu et al. | |
| 2019/0236132 A1* | 8/2019 | Zhu | G06N 20/00 |
| 2019/0268470 A1 | 8/2019 | Amir et al. | |
| 2019/0340249 A1 | 11/2019 | Connell, II | |
| 2019/0349321 A1* | 11/2019 | Cai | G06N 3/006 |
| 2019/0355042 A1 | 11/2019 | Swierk et al. | |
| 2020/0013070 A1 | 1/2020 | Walthers et al. | |
| 2020/0027094 A1 | 1/2020 | Consalvo et al. | |
| 2020/0133755 A1 | 4/2020 | Bansal et al. | |
| 2020/0184355 A1 | 6/2020 | Mehta | |
| 2020/0218492 A1 | 7/2020 | Farivar | |
| 2020/0240875 A1 | 7/2020 | Venkateswaran et al. | |
| 2020/0302018 A1* | 9/2020 | Turkkan | G06F 16/3347 |
| 2020/0311738 A1 | 10/2020 | Gupta et al. | |
| 2020/0364638 A1 | 11/2020 | Molloy et al. | |
| 2021/0103703 A1 | 4/2021 | Galitsky | |
| 2021/0109832 A1 | 4/2021 | Ladkani | |
| 2021/0136195 A1 | 5/2021 | Adibi et al. | |
| 2021/0157985 A1 | 5/2021 | Rotkop et al. | |
| 2021/0208971 A1 | 7/2021 | Srinivasan | |
| 2021/0209635 A1 | 7/2021 | Czajka et al. | |
| 2021/0264438 A1 | 8/2021 | Singh | |
| 2021/0319189 A1 | 10/2021 | Trehan | |
| 2021/0357598 A1 | 11/2021 | Li | |
| 2022/0019935 A1 | 1/2022 | Ghatage et al. | |
| 2022/0036175 A1 | 2/2022 | Krishnamurthy et al. | |
| 2022/0050733 A1 | 2/2022 | Selvaraju | |
| 2022/0066791 A1 | 3/2022 | Drury | |
| 2022/0067746 A1 | 3/2022 | Thakkar | |
| 2022/0068263 A1 | 3/2022 | Roy | |
| 2022/0094789 A1 | 3/2022 | Lau et al. | |
| 2022/0129257 A1 | 4/2022 | Touati et al. | |
| 2022/0172079 A1 | 6/2022 | Kalandyk et al. | |
| 2022/0172222 A1 | 6/2022 | Chin et al. | |
| 2022/0197725 A1 | 6/2022 | Liu | |
| 2022/0208188 A1 | 6/2022 | Yoffe et al. | |
| 2022/0215273 A1* | 7/2022 | Sethi | G06N 5/01 |
| 2022/0308943 A1 | 9/2022 | Srinivasan et al. | |
| 2022/0394348 A1 | 12/2022 | Hatambeiki et al. | |
| 2022/0398383 A1 | 12/2022 | Sethi et al. | |
| 2022/0400060 A1 | 12/2022 | Sethi et al. | |
| 2023/0047346 A1 | 2/2023 | Daniel et al. | |
| 2023/0053913 A1 | 2/2023 | De Souza et al. | |
| 2023/0073644 A1 | 3/2023 | Thakkar et al. | |
| 2023/0132116 A1 | 4/2023 | Sethi et al. | |

FOREIGN PATENT DOCUMENTS

| | | | | |
|---|---|---|---|---|
| CA | 3052174 A1 * | 2/2020 | | G06F 40/20 |
| CA | 3206778 A1 * | 8/2022 | | H04L 41/12 |
| CA | 2867335 C | 9/2023 | | |
| CN | 105493446 A | 4/2016 | | |
| CN | 108415789 A | 8/2018 | | |
| CN | 113127746 A | 7/2021 | | |
| EP | 1873699 A1 | 1/2008 | | |
| EP | 1602102 B1 | 12/2010 | | |
| WO | 9858356 A2 | 12/1998 | | |
| WO | 2009087489 A1 | 7/2009 | | |
| WO | 2013151808 A1 | 10/2013 | | |
| WO | WO-2014043623 A1 * | 3/2014 | | G06F 11/008 |
| WO | 2021050170 A1 | 3/2021 | | |

OTHER PUBLICATIONS

Dhoolia et al., "A cognitive system for business and technical support: A case study", 2017, IBM Journal of Research and Development, vol. 61, No. 1, paper 7, pp. 74-85 (Year: 2017).

Law et al., "An Integrated Case-Based Reasoning Approach for Intelligent Help Desk Fault Management", 1997, Expert Systems with Applications, vol. 13, No. 4, pp. 265-274 (Year: 1997).

Anonymous, "Cloud-Based Contact Center Market Next Big Thing / Major Giants Five9, CloudTalk, Talkdesk", M2 Presswire (Year: 2021).

(56) References Cited

OTHER PUBLICATIONS

Caporuscio Mauro et al., "Smart-troubleshooting connected devices: Concept, challenges and opportunities", Future Generation Computer Systems, Elsevier Science Publishers. Amsterdam, NL, vol. 111. Sep. 16, 2019, pp. 681-697 [retrieved on Sep. 16, 2019].

International Search Report and Written Opinion mailed May 8, 2023, issued in corresponding PCT Application No. PCT/US2023/010749.

Shannon Keown, "What Call Center Location is Right for You? (& Considerations)", Sep. 1, 2021.

Unknown, "Multi-Site Contact Centers—Can they work for your business?", May 13, 2021.

Mark Granger, "ServiceNow products and services explained", https://web/archive.org/web/20210420101531/https://www.nelsonfrank.com/insights/servicenow-products-services-explained <accessed date Aug. 12, 2022>, 10 pages.

Anonymous, "Retailcustomerexperience.com—Networld Media Group: 5 best practices for building the omnichannel customer service strategy", Newstex Entrepreneurship Blogs, 2019 (Year: 2019), pp. 1-2.

Anonymous, "Chongqing Centre Service Outsourcing Ind Files Chinese Patent Application for Call Center Service Management System", Global IP News.Information Technology Patent News, 2020 (Year: 2020).

D. Hoogeveen et al., "Detecting misflagged duplicate questions in community question-answering archives", 12th International AAAI Conference on Web and Social Media, ICWSM 2018 (Year: 2018).

T. E. Workman et al., "Rethinking information delivery: using a natural language processing application for point-of-care data discovery*[dagger]", Journal of the Medical Library Association, vol. 100, (2), pp. 113-120, 2012 (Year: 2012).

Ranchal et al, "Protection of Identity Information in Cloud Computing without Trusted Third Party", 2010 29th IEEE International Symposium on Reliable Distributed Systems, pp. 368-372.

* cited by examiner

METHOD AND SYSTEM FOR PREDICTING NEXT STEPS FOR CUSTOMER SUPPORT CASES

BACKGROUND

Computing devices may provide services. To provide the services, the computing devices may include hardware components and software components. The services provided by the computing devices may be limited by these components. The computing devices may experience failures. Users of the computing devices may resolve the failures of the computing devices.

SUMMARY

In general, in one aspect, the invention relates to a method for managing support cases associated with clients in accordance with one or more embodiments of the invention. The method includes obtaining a support case associated with a client of the clients; in response to obtaining the support case: obtaining contextual information associated with the support case; obtaining client telemetry data associated with the support case; selecting a portion of training data that is similar to the support case based on the client telemetry data, the contextual information, and the support case; generating a prediction model using the portion of the training data and a classification algorithm; and generating predictions using the prediction model, the client telemetry data, the contextual information, and the support case.

In general, in one aspect, the invention relates to a system for managing support cases associated with clients in accordance with one or more embodiments of the invention. The system includes persistent storage, which stores training data, and a support recommendation system. The support recommendation system, which includes a processor and memory, is configured to obtain a support case associated with a client of the clients; in response to obtaining the support case: obtain contextual information associated with the support case; obtain client telemetry data associated with the support case; select a portion of training data that is similar to the support case based on the client telemetry data, the contextual information, and the support case; generate a prediction model using the portion of the training data and a classification algorithm; and generate predictions using the prediction model, the client telemetry data, the contextual information, and the support case.

In general, in one aspect, the invention relates to a non-transitory computer readable medium which includes computer readable program code, which when executed by a computer processor enables the computer processor to perform a method for managing support cases associated with clients in accordance with one or more embodiments of the invention. The method includes obtaining a support case associated with a client of the clients; in response to obtaining the support case: obtaining contextual information associated with the support case; obtaining client telemetry data associated with the support case; selecting a portion of training data that is similar to the support case based on the client telemetry data, the contextual information, and the support case; generating a prediction model using the portion of the training data and a classification algorithm; and generating predictions using the prediction model, the client telemetry data, the contextual information, and the support case.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for resolving support cases of client failures. Specifically, a system in accordance with embodiments of the invention may obtain support cases from clients and generate predictions that indicate steps to resolve to resolve the support cases. The generated predictions may be used to efficiently resolve support cases associated with failures of clients or client components. By doing so, the impact of client failures on systems may be reduced.

Figure 1:
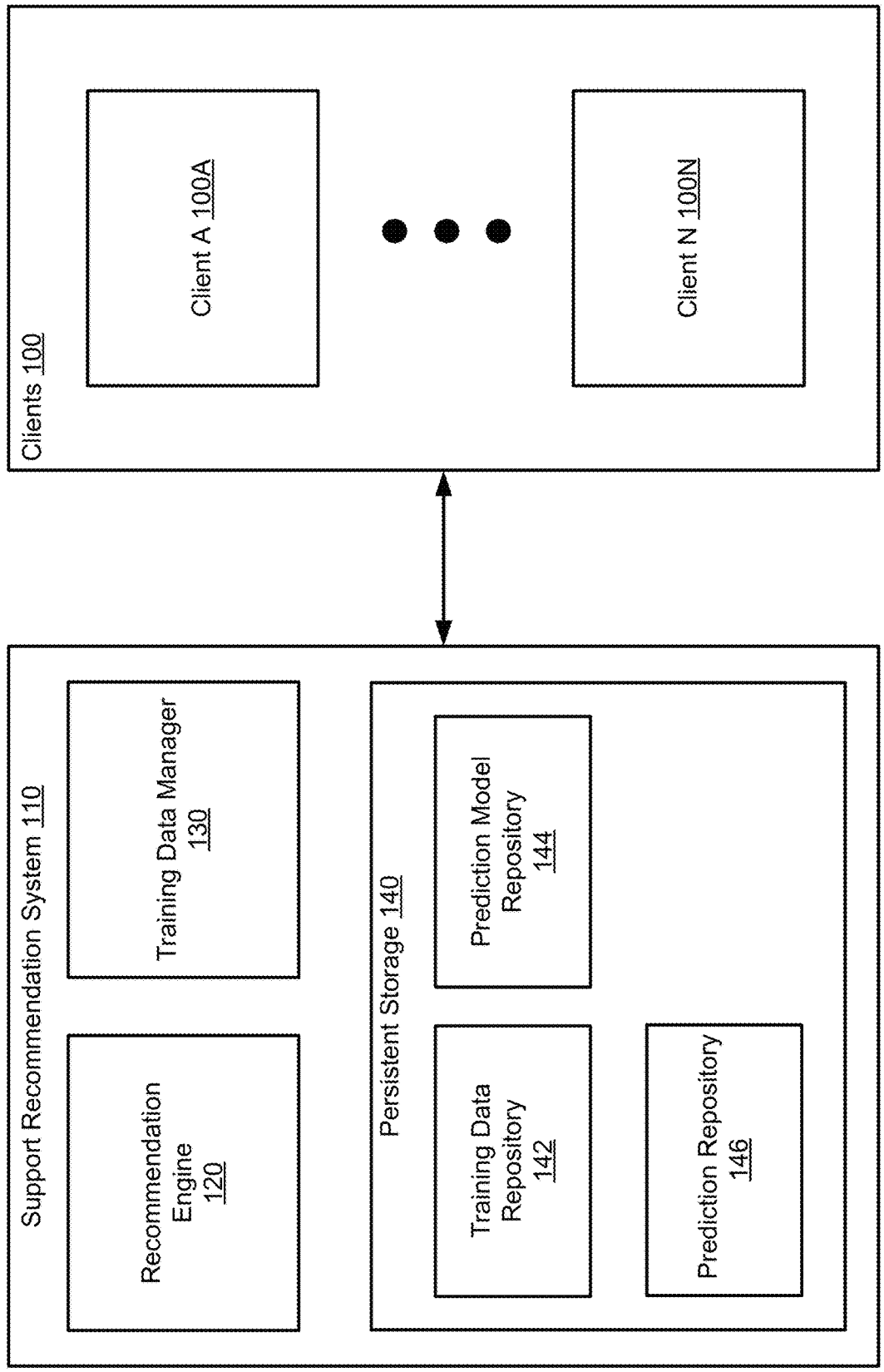
FIG. 1 shows a diagram of a system in accordance with one or more embodiments of the invention.

FIG. 1 shows a diagram of a system in accordance with one or more embodiments of the invention. The system may include clients (100) that obtain prediction services from a recommendation system (110). The prediction services may include generating predictions for the clients (100) that indicate next steps to resolve support cases associated with failures of clients (100). The prediction services may further include initiating actions for the clients (100) based on the predictions. By utilizing such services, data that may be relevant to the clients (100) may be stored in a persistent storage (140) of the recommendation system (110).

The components of the system illustrated in FIG. 1 may be operably connected to each other and/or operably connected to other entities (not shown) via any combination of wired and/or wireless networks. Each component of the system illustrated in FIG. 1 is discussed below.

The clients (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 4A-4B. The clients (100) may be implemented using other types of computing devices without departing from the invention. For additional details regarding computing devices, refer to FIG. 6.

The clients (100) may be implemented using logical devices without departing from the invention. For example, the clients (100) may include virtual machines that utilize computing resources of any number of physical computing devices to provide the functionality of the clients (100). The clients (100) may be implemented using other types of logical devices without departing from the invention.

A system in accordance with one or more embodiments of the invention may include any number of clients (e.g., 100A, 100N) without departing from the invention. For example, a system may include a single client (e.g., 100A) or multiple clients (e.g., 100A, 100N).

In one or more embodiments of the invention, the clients (100) include client components (not shown) that provide computer implemented services to users. The computer implemented services may include, for example, database services and/or any other computer implemented services without departing from the invention. The client components may include hardware components (e.g., central processing units, graphics processing units, memory, storage devices, etc.) and/or software components (e.g., applications, operating systems, virtual machines, etc.). The clients (100) and/or components of the clients may fail. When clients (100) fail, support cases may be created by users of the clients (100). Support cases may be one or more data structures that specify information associated with the failures. The clients (100) may use prediction services provided by the support recommendation system (110).

To use the prediction services, the clients (100) may perform actions under the directions of the support recommendation system (110). By doing so, the support recommendation system (110) may orchestrate the transmission of data and actions between the support recommendation system (110) and the clients (100).

For example, a client (100) may send data regarding client failures (i.e., client telemetry data, support case information, and contextual information). The recommendation system (110) may generate prediction models that may generate predictions that indicate the steps to take to resolve a support case associated with a failure of a client (100) or component of a client (100).

In one or more embodiments of the invention, the support recommendation system (110) is implemented using a computing device. The computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 4A-4B. The recommendation system (110) may be implemented using other types of computing devices without departing from the invention. For additional details regarding computing devices, refer to FIG. 6.

The support recommendation system (110) may be implemented using logical devices without departing from the invention. For example, the recommendation system (110) may include virtual machines that utilize computing resources of any number of physical computing devices to provide the functionality of the recommendation system (110). The recommendation system (110) may be implemented using other types of logical devices without departing from the invention.

In one or more embodiments of the invention, the support recommendation system (110) provides prediction services. Prediction services may include generation of prediction models, generation of predictions, and/or initiating actions based on the predictions. By doing so, the support recommendation system (110) may improve the efficiency of resolving support cases associated with failures of clients (100). The support recommendation system (110) may provide other and/or additional services without departing from the invention.

In one or more embodiments of the invention, the recommendation engine (120) is implemented using a computing device. The computing device may be, for example, a mobile phone, tablet, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the recommendation engine (120) described through this application and all, or a portion, of the methods illustrated in FIGS. 4A-4B. The recommendation engine (120) may be implemented using other types of computing devices without departing from the invention. For additional details regarding computing devices, refer to FIG. 6.

In one or more embodiments of the invention, the recommendation engine (120) provides prediction generation services. The prediction generation services may include (i)

generating prediction models, (ii) generating cyclic training data using, and (iii) generating predictions. The recommendation engine (120) may provide other and/or additional services without departing from the invention. For additional details regarding the recommendation engine (120), refer to FIG. 2.

In one or more embodiments of the invention, the training data manager (130) is implemented using a computing device. The computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) causes the computing device to provide the functionality of the training data manager (130) described through this application. The training data manager (130) may be implemented using other types of computing devices without departing from the invention. For additional details regarding computing devices, refer to FIG. 6.

In one or more embodiments of the invention, the training data manager (130) provides training data management services. Providing training data management services may include obtaining training data from the clients (100) and enabling the recommendation engine (120) to access the obtained training data. The training data manager (130) may provide other and/or additional services without departing from the invention.

In one or more embodiments of the invention, the persistent storage (140) is implemented using a storage device. The storage device may be implemented using physical storage devices and/or logical storage devices. The persistent storage (140) may be implemented using other types of devices that provide data storage services without departing from the invention.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as hard disk drives, solid state drives, tape drives, or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

In one or more embodiments of the invention, the persistent storage (140) provides data storage services to the recommendation system (110), the recommendation engine (120), the training data manager (130), and/or other entities. The data storage services may include storing of data and providing of previous stored data. The persistent storage (140) may provide other and/or additional services without departing from the invention.

The persistent storage (140) may store data structures including a training data repository (142), a prediction model repository (144), and a prediction repository (146). Each of these data structures are discussed below.

The training data repository (142) may be one or more data structures that may include data generated by the clients (100), maintained by the training data manager (130), and utilized by the recommendation engine (120). The training data repository (142) may include any quantity of data. The data may include information regarding the failures of clients (100). For additional details regarding the training data repository (142), refer to FIG. 3A.

The prediction models repository (144) may be data structures that represent any number of classification prediction models for predictions that may be generated by the recommendation engine (120) and utilized by the support recommendation system (110) to generate predictions. The prediction model repository (144) may be, for example, a classification model generated by applying the training data to a classification algorithm. The classification algorithm may be any type of classification algorithm without departing from the invention.

The prediction repository (146) may be a data structure that stores predictions generated by the prediction models (144). The prediction repository (146) may store any number of generated predictions. The stored predictions may specify steps to resolve support cases associated with failures of clients (100).

While the data structures (e.g., 142, 144, 146) are illustrated as separate data structures and have been discussed as including a limited amount of specific information, any of the aforementioned data structures may be divided into any number of data structures, combined with any number of other data structures, and may include additional, less, and/or different information without departing from the invention. Additionally, while illustrated as being stored in the persistent storage (140), any of the aforementioned data structures may be stored in different locations (e.g., in persistent storage of other computing devices and/or spanned across any number of computing devices) without departing from the invention.

Figure 2:
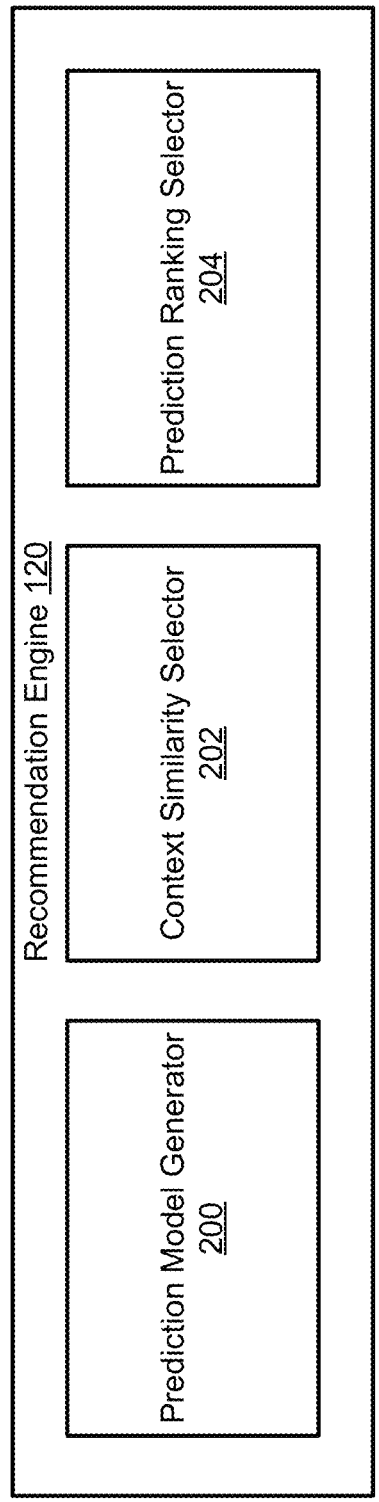
FIG. 2 shows a diagram of a recommendation engine in accordance with one or more embodiments of the invention.

FIG. 2 shows a diagram of a recommendation engine in accordance with one or more embodiments of the invention. The recommendation engine (120) may be similar to the one shown in FIG. 1. As discussed above, the recommendation engine (120) may provide prediction model generation services and prediction generation services for the recommendation system (110, FIG. 1).

To provide the aforementioned functionality of the recommendation engine (120), the recommendation engine (120) may include a prediction model generator (200), a context similarity selector (202), and a prediction ranking selector (204). Each component of the recommendation engine (120) is discussed below.

The prediction model generator (200) may provide prediction model generation services for the recommendation engine (120).

To provide the prediction model generation services, the prediction model generator (200) may obtain the training data (300, FIG. 3A) from the training data manager (130, FIG. 1), and use a classification algorithm with the training data (300, FIG. 3A) to generate prediction models (144, FIG. 1). The classification algorithm may be a random forest classification algorithm. The classification algorithm may be other types of classification algorithms without departing from the invention.

In one or more embodiments of the invention, the prediction model generator (200) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the prediction model generator (200) described throughout this application and/or all or a portion of the methods illustrated in FIGS. 4A-4B. The prediction model generator (200) may be some other physical device without departing from the invention.

Figure 4A:
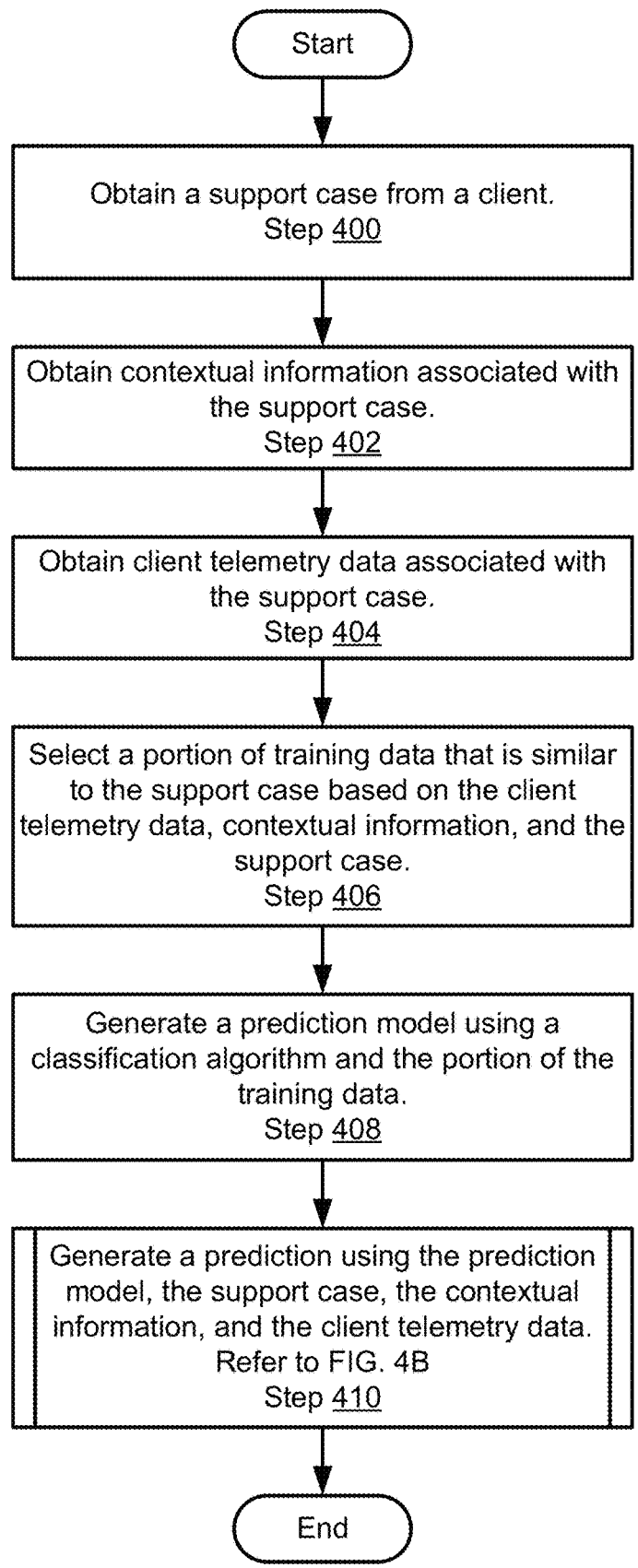
FIG. 4A shows a flowchart of a method of resolving a support case in accordance with one or more embodiments of the invention.
Figure 4B:
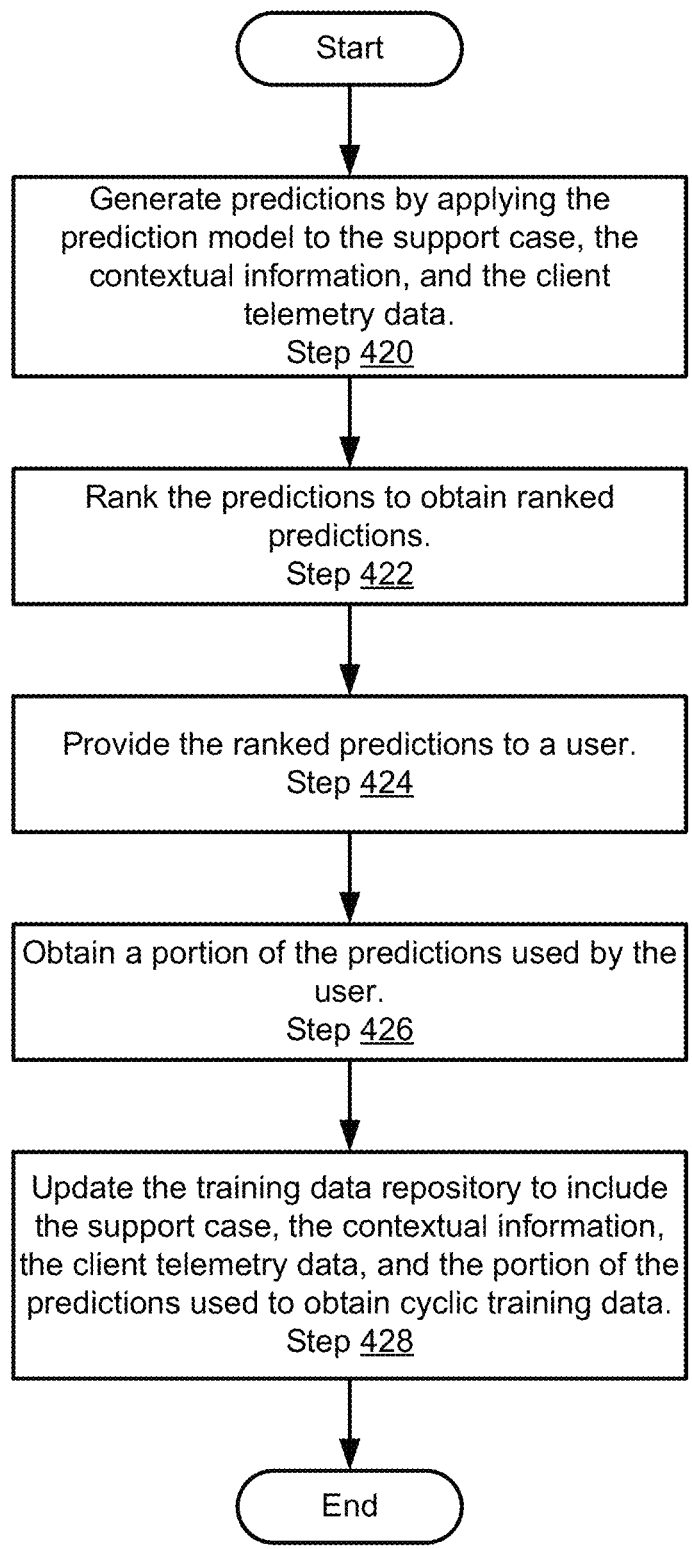
FIG. 4B shows a flowchart of a method of generating a prediction in accordance with one or more embodiments of the invention.

The prediction model generator (200) may be implemented using computer instructions (e.g., computing code) stored on a persistent storage (e.g., 140, FIG. 1) that when executed by a processor of the recommendation engine (120) causes the recommendation engine to perform the functionality of the prediction model generator (200) described throughout this application and/or all or a portion of the methods illustrated in FIGS. 4A-4B.

In one or more embodiments of the invention, the context similarity selector (202) contextual selection services for the recommendation engine (120). The contextual selection services may include selecting and/or identifying contextual information, support case information, and/or client telemetry data included in the training data that are similar to contextual information, support case information, and/or client telemetry data associated with an obtained support case in which a prediction is to be generated. The context similarity selector (202) may provide other and/or additional services to the recommendation engine (120) and/or other entities without departing from the invention.

In one or more embodiments of the invention, the context similarity selector (202) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the context similarity selector (202) described throughout this application and/or all or a portion of the methods illustrated in FIGS. 4A-4B. The context similarity selector (202) may include other types of physical devices without departing from the invention.

The context similarity selector (202) may be implemented using computer instructions (e.g. computer code) stored on a persistent storage that when executed by a processor of the recommendation engine (120), cause the recommendation engine (120) to provide the functionality of the context similarity selector (202) described throughout this application and/or all or a portion of the methods illustrated in FIGS. 4A-4B.

In one or more embodiments of the invention, the prediction ranking selector (204) provides prediction ranking services for the recommendation engine (120) and/or other entities. The prediction ranking services may include ranking the predictions based on occurrence of the predictions when the predictions are generated. The prediction ranking selector (204) may provide other and/or additional services without departing from the invention.

In one or more embodiments of the invention, the prediction ranking selector (204) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the prediction ranking selector (204) described throughout this application and/or all or a portion of the methods illustrated in FIGS. 4A-4B. The prediction ranking selector (204) may be implemented using other types of physical devices without departing from the invention.

The prediction ranking selector (204) may be implemented using computer instructions (e.g. computer code) stored on a persistent storage that when executed by a processor of the recommendation engine (120), cause the recommendation engine (120) to provide the functionality of the prediction ranking selector (204) described throughout this application and/or all or a portion of the methods illustrated in FIGS. 4A-4B.

While the recommendation engine (120) of FIG. 2 has been described and illustrated as including a limited number of components for the sake of brevity, a recommendation engine (120) in accordance with embodiments of the invention may include additional, fewer, and/or different components than those illustrated in FIG. 2 without departing from the invention.

Figure 3A:
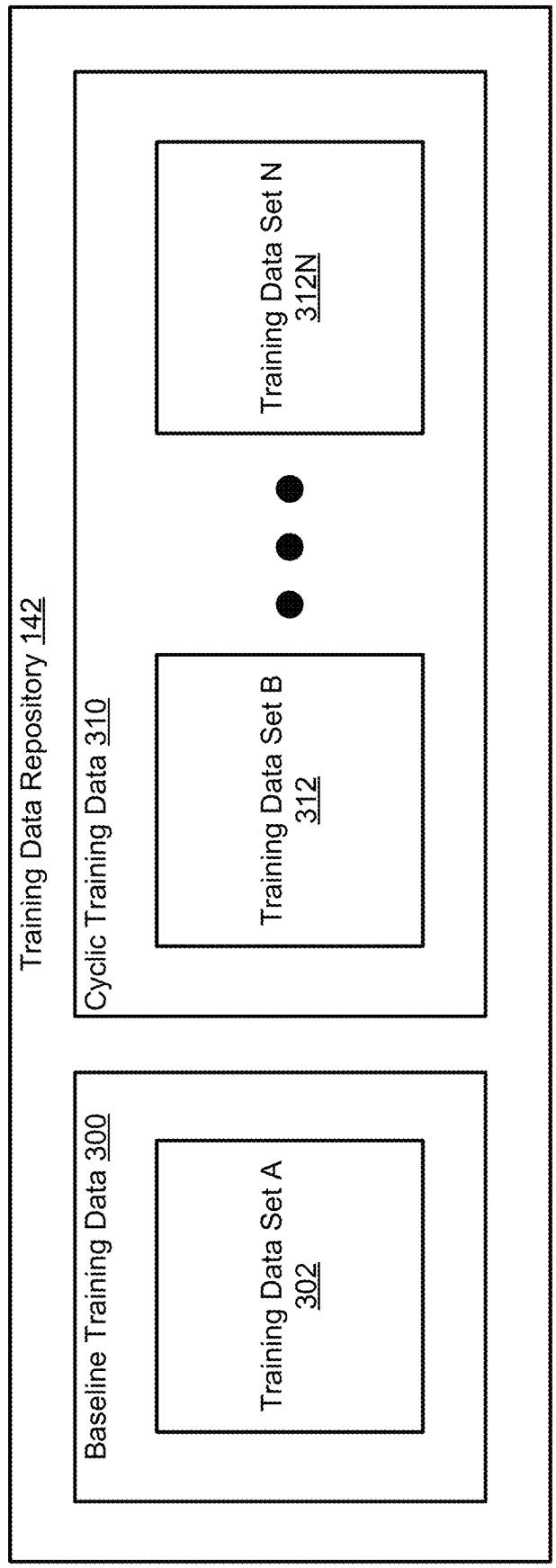
FIG. 3A shows a diagram of a training data repository in accordance with one or more embodiments of the invention.

FIG. 3A shows a diagram of a training data repository in accordance with one or more embodiments of the invention. The training data repository (142) may be similar to the training data repository shown in FIG. 1. The data structures stored in the training data repository (142) may include training data provided by clients (100, FIG. 1) and utilized by a recommendation engine (120, FIG. 1). The training data may include baseline training data (300) and/or cyclic training data (310). Each of these data structures is discussed below.

The baseline training data (300) may be a data structure that includes data provided by the clients (100, FIG. 1). The data may include the data regarding failures of clients (100, FIG. 1). The baseline training data (300) may include any number of features. The baseline training data (300) may be used by the recommendation engine (120, FIG. 1) to generate a first prediction model. The baseline training data may include a training data set A (302). For additional information regarding training data set A, refer to FIG. 3B. The baseline training data (300) may include other and/or additional training data sets without departing from the invention.

The cyclic training data (310) may be a data structure including data provided by the clients (100, FIG. 1). The cyclic training data (310) may include the baseline training data (300) and data regarding client failures of clients (100, FIG. 1) associated with support cases in which predictions were generated by the support recommendation system (110, FIG. 1A). The cyclic training data (310) may be used by the recommendation engine (120, FIG. 1) to generate improved prediction models (144, FIG. 1). The cyclic training data (310) may include one or more training data sets (e.g., training data set B (312) and training data set N (312N)). There may be any number of training data sets (e.g., 312 and 312N) in the cyclic training data (310).

While the training data repository (142) of FIG. 3A has been described and illustrated as including a limited number of components for the sake of brevity, a training data repository (142) in accordance with embodiments of the invention may include additional, fewer, and/or different components than those illustrated in FIG. 3A without departing from the invention.

Figure 3B:
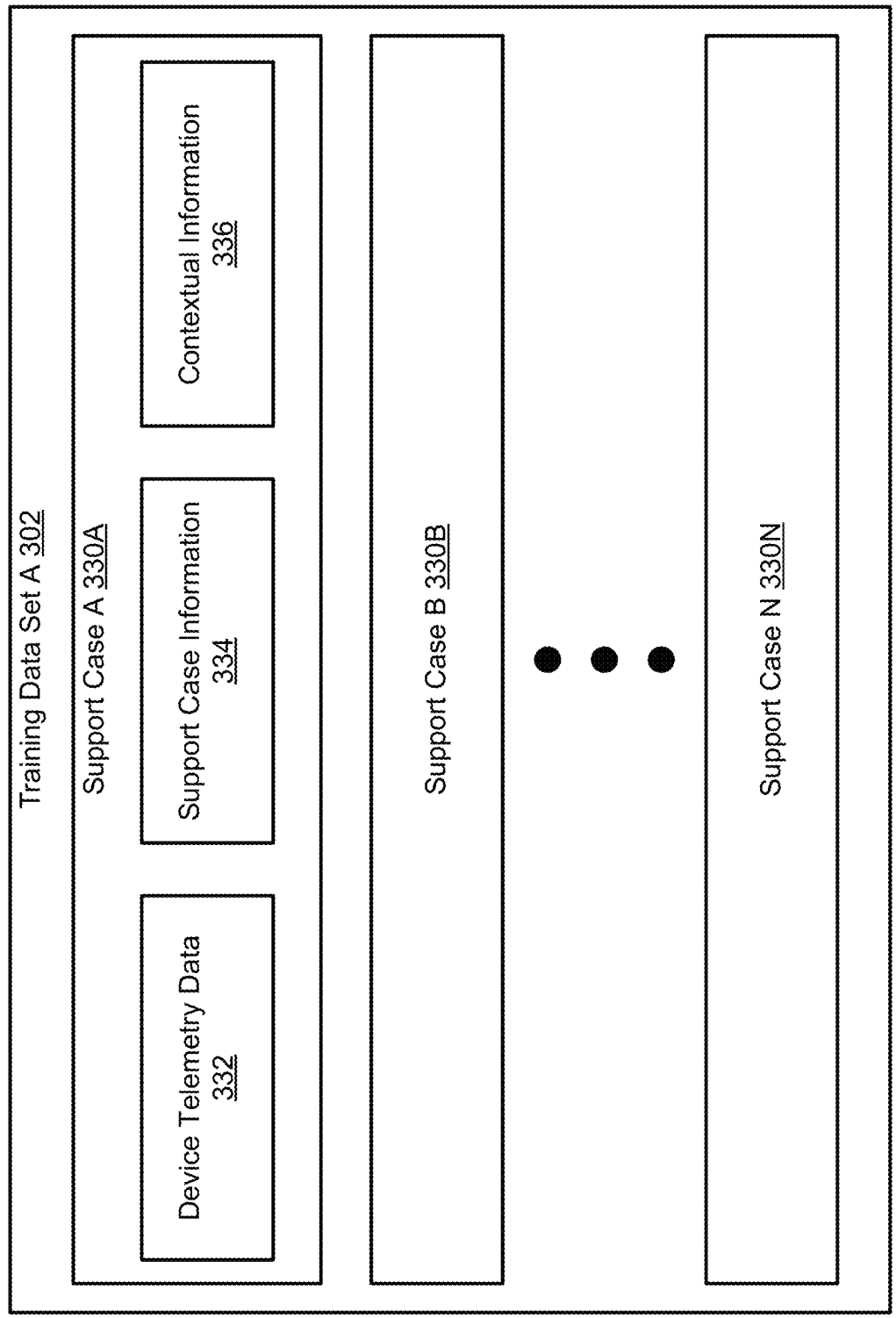
FIG. 3B shows a diagram of a training data set in accordance with one or more embodiments of the invention.

FIG. 3B shows a diagram of a training data set in accordance with one or more embodiments of the invention. The training data set A (302) may be similar to the training data set A (302) shown in FIG. 3A. Training data set A (302) may be a data structure that includes data from clients (100, FIG. 1) regarding the client failures. The data in training data set A (302) may include any number of features. The features included in training data set A (302) may represent observable phenomena associated with client failures of the clients. Training data set A (302) may include any number of support cases such as support case A (330A), support case B (330B) and support case N (330N). A support case (e.g., support case A (330A) may include device (e.g., client) telemetry data (332), support case information (334), and contextual information (336). The support cases may include other and/or additional information without departing from the invention. Each of the aforementioned components of the support cases is discussed below.

The device telemetry data (332) may be one or more data structures that include information regarding the client components included in the clients (e.g., 100, FIG. 1) as discussed above. The information may include, for example, client component identifiers, client component types, client component performance information, and other and/or additional information regarding the client components that failed without departing from the invention. The client component identifiers may refer to unique, global bit strings associated with a particular client component that may be used to specify that particular component. The client component type may be a unique bit string, or tag associated with a type of client component. The client component types may be types of hardware devices such as central control processors (CPUs), graphics control processors (GPUs), FPGAs, network controllers, storage devices such as tape drives or RAM, and/or other and/or additional types of hardware devices included in the clients without departing from the invention. The client component type may also be types of software components such as operating systems, applications (e.g., database applications), virtual machines, and/or other and/or additional types of software components without departing from the invention.

The client performance information may include performance characteristics associated with the client components. The performance characteristics may include read and write errors to storage devices, temperature of client components, timestamps associated with device telemetry data (332), client component dependencies, authorization information associated with client components, and other and/or additional types of performance characteristics without departing from the invention. The device telemetry data (332) may be generated by the clients (100, FIG. 1) and/or other entities not illustrated in the system of FIG. 1. The device telemetry data (332) may be included in the training data obtained by the recommendation system (110, FIG. 1) and may be used by the recommendation system (110, FIG. 1) to generate prediction models (144, FIG. 1) and predictions. The device telemetry data (332) may include other and/or additional information and may be used for other and/or additional purposes without departing from the invention.

The support case information (334) may be one or more data structures that include information regarding the failures of the clients (100, FIG. 1A). The information may include client component identifiers associated with client components that failed, the failure types, and when the failures occurred. The support case information (334) may include other and/or additional information and may be used for other and/or additional purposes without departing from the invention.

The contextual information (336) may be one or more data structures that include information associated with client components in the clients (e.g., 100, FIG. 1) that did not fail. The information may include, for example, client component identifiers, client component types, client component performance information, and other and/or additional information regarding all client components without departing from the invention (see above discussion). The contextual information (336) may also include, for example, temperature information, issue severity, and other and/or additional information associated with client failure. The contextual information (336) may include other and/or additional information and may be used for other and/or additional purposes without departing from the invention.

While the training data set A (302) of FIG. 3B has been described and illustrated as including a limited number of components for the sake of brevity, a training data set A (302) in accordance with embodiments of the invention may include additional, fewer, and/or different components than those illustrated in FIG. 3B without departing from the invention.

FIG. 4A shows a flowchart of a method of resolving a support case in accordance with one or more embodiments of the invention. The method may be performed by, for example, the support recommendation system (110, FIG. 1). Other components of the system illustrated in FIG. 1 may perform all, or a portion, of the method of FIG. 4A without departing from the invention.

While FIG. 4A is illustrated as a series of steps, any of the steps may be omitted, performed in a different order, additional steps may be included, and/or any or all of the steps may be performed in a parallel and/or partially overlapping manner without departing from the invention.

In step 400, a support case is obtained from a client.

In one or more embodiments of the invention, the support recommendation system obtains a message from a client. The message may include a support case. A client, or a user of a client, may generate a support case in response to a failure of the client or a failure of a component of the client. The support case may include support case information. The message may include other and/or additional information without departing from the invention. The support case may be obtained via other and/or additional methods without departing from the invention.

In step 402, contextual information associated with the support case is obtained.

In one or more embodiments of the invention, the support recommendation system sends a message to the client associated with the support case obtained in step 400. The message may include a request for contextual information associated with the support case. The message may include other and/or additional information without departing from the invention. In response to obtaining the request for contextual information, the client may generate and/or obtain the contextual information associated with the support case. After generating and/or obtaining the contextual information, the client may send the contextual information to the support recommendation system. The contextual information associated with the support case may be obtained via other and/or additional methods without departing from the invention.

In step 404, client telemetry data associated with the support case is obtained.

In one or more embodiments of the invention, the support recommendation system sends a message to the client associated with the support case obtained in step 400. The message may include a request for client telemetry data associated with the support case. The message may include other and/or additional information without departing from the invention. In response to obtaining the request for client telemetry data, the client may generate and/or obtain the client telemetry data associated with the support case. After generating and/or obtaining the client telemetry data, the client may send the client telemetry data to the support recommendation system. The client telemetry data associated with the support case may be obtained via other and/or additional methods without departing from the invention.

In step 406, a portion of the training data associated with the support case is selected based on the client telemetry data, the contextual information, and support case information associated with the support case.

In one or more embodiments of the invention, the recommendation engine of the support recommendation system selects a portion of the training data that is associated with the support case based on the contextual information, the client telemetry data and support case information. As discussed above, the training data may include prior resolved support cases, with each support case including client telemetry data, contextual information, and support case information associated with the support case. The recommendation engine may select a portion of the training data that share the same and/or similar (e.g., within predefined absolute and/or percent differences or a similarity threshold) contextual information, client telemetry data, and support case information as the support case obtained in step 400 to identify a training data set that is relevant to the obtained support case. The recommendation engine may generate a similarity score that indicates the similarity between training data and client telemetry data, contextual information, and support case information of a support case. The recommendation may select the portion of the training data by comparing the support case information, the contextual information, and/or the client telemetry data of the support case obtained in step 400 with the support case information, the client telemetry data, and/or the contextual information of the resolved support cases included in the training data. Any appropriate similarity calculation methods or combinations of similarity calculation methods may be used to determine the similarities between the support case and the training data such as cosine similarity without departing from the invention. The portion of the training data associated with the support case may be selected based on the client telemetry data, the contextual information, and support case information associated with the support case via other and/or additional methods without departing from the invention.

In step 408, a prediction model is generated using a classification algorithm and the portion of the training data.

In one or more embodiments of the invention, the recommendation engine obtains the identified portion of the training data and introduces the identified portion of the training data to a classification algorithm to generate the prediction model. The classification algorithm may be, for example, a random forest classification algorithm. The naive Bayesian classification algorithm, when operating on the processed training data, may generate prediction calculations, each: (i) reflecting a subset of features included in the portion of the training data and (ii) generating a prediction. The generated prediction calculations may be used, in accordance with the model, to generate predictions that specify one or more steps to resolve a support case. The prediction model may be generated via other and/or additional methods without departing from the invention. For example, different types of machine learning algorithms and/or classification algorithms may be utilized to generate corresponding data structures that may be used to generate predictions without departing from the invention.

In step 410, a prediction is generated using the prediction model, the support case information, the contextual information, and the client telemetry data.

In one or more embodiments of the invention, the prediction is generated by applying the prediction model generated in step 408 to the support case information, the contextual information, and the client telemetry data associated with the support case obtained in step 400. A prediction may be generated using the prediction model, the support case information, the contextual information, and the client telemetry data via other and/or additional methods without departing from the invention.

For additional information regarding generating a prediction using the prediction model, the support case information, and the client telemetry data, refer to FIG. 4B.

In one or more embodiments of the invention, the method ends following step 410.

FIG. 4B shows a flowchart of a method of generating a prediction in accordance with one or more embodiments of the invention. The method may be performed by, for example, the recommendation system (110, FIG. 1). Other components of the system illustrated in FIG. 1 may perform all, or a portion, of the method of FIG. 4B without departing from the invention.

While FIG. 4B is illustrated as a series of steps, any of the steps may be omitted, performed in a different order, additional steps may be included, and/or any or all of the steps may be performed in a parallel and/or partially overlapping manner without departing from the invention.

In step 420, predictions are generated by applying the prediction model to the support case information, the contextual information, and the client telemetry data.

In one or more embodiments of the invention, the recommendation engine introduces the support case information, the contextual information, and the client telemetry data associated with the support case into the generated prediction model. In other words, the generated prediction model may use the support case information, the contextual information, and the client telemetry data associated with the support case as input and produce predictions specifying next steps to take to resolve the support case. The generated model may generate any number of predictions. Predictions may be generated by applying the prediction model to the support case information, the contextual information, and the client telemetry data via other and/or additional methods without departing from the invention.

In step 422, the predictions are ranked to obtain ranked predictions.

In one or more embodiments of the invention, the recommendation engine of the support recommendation system ranks the predictions generated by the prediction model by aggregating the prediction made by the prediction generation calculations (i.e., multiple classifiers) included in the prediction model. The recommendation engine may rank particular predictions based on their occurrence in the predictions. In other words, particular predictions that are the result of more prediction calculations may be ranked higher than predictions that are the result of less prediction calculations. Each prediction of the predictions may be ranked. The resulting ranked predictions may be the obtained ranked predictions. The predictions may be ranked to obtain ranked predictions via other and/or additional methods without departing from the invention.

In step 424, the ranked predictions are provided to a user.

In one or more embodiments of the invention, the support recommendation system provides the ranked predictions to a user of the support recommendation system. The support recommendation system may provide the ranked predictions to a user using and appropriate method of user interfaces without departing from the invention. The support recommendation system may provide the ranked predictions to a user using a graphical user interface. In response to obtaining the ranked predictions, the user may attempt to resolve the support case using the steps specified by the ranked predications, starting with the steps specified by the highest ranked prediction. The ranked predictions may be provided to a user via other and/or additional methods without departing from the invention.

In step 426, a portion of the predictions used by the user are obtained from the user.

In one or more embodiments of the invention, the user identifies the prediction(s) that specified the steps to resolve the support case that the user used to successfully resolve the support case. The user may send a message to the support recommendation system. The message may include the identified prediction that specified the steps to resolve the support case that the user used to successfully resolve the support case. The message may include other and/or additional information without departing from the invention. The portion of the predictions used by the user may be obtained from the user via other and/or additional methods without departing from the invention.

In step 428, training data repository is updated to include support case information associated with the support case, the contextual information, the client telemetry data, and the portion of the prediction used to obtain cyclic training data.

In one or more embodiments of the invention, the support recommendation system updates the training data repository by adding the contextual information, the support case information, and the client telemetry data associated with the support case obtained in step 400 to the training data repository. The portion of the predictions used to successfully resolve the support case may also be added to the training data repository. As a result, cyclic training data may be obtained. The cyclic training data may include previous support cases and used predictions generated by the support recommendation system to improve the accuracy of the support recommendation system. The training data repository may be updated to include support case information associated with the support case, the contextual information, the client telemetry data, and the portion of the prediction used to obtain cyclic training data via other and/or additional methods without departing from the invention.

In one or more embodiments of the invention, the method ends following step 428.

FIGS. 5A-5E show diagrams of the operation of an example system over time in accordance with one or more embodiments of the invention.

Figure 5A:
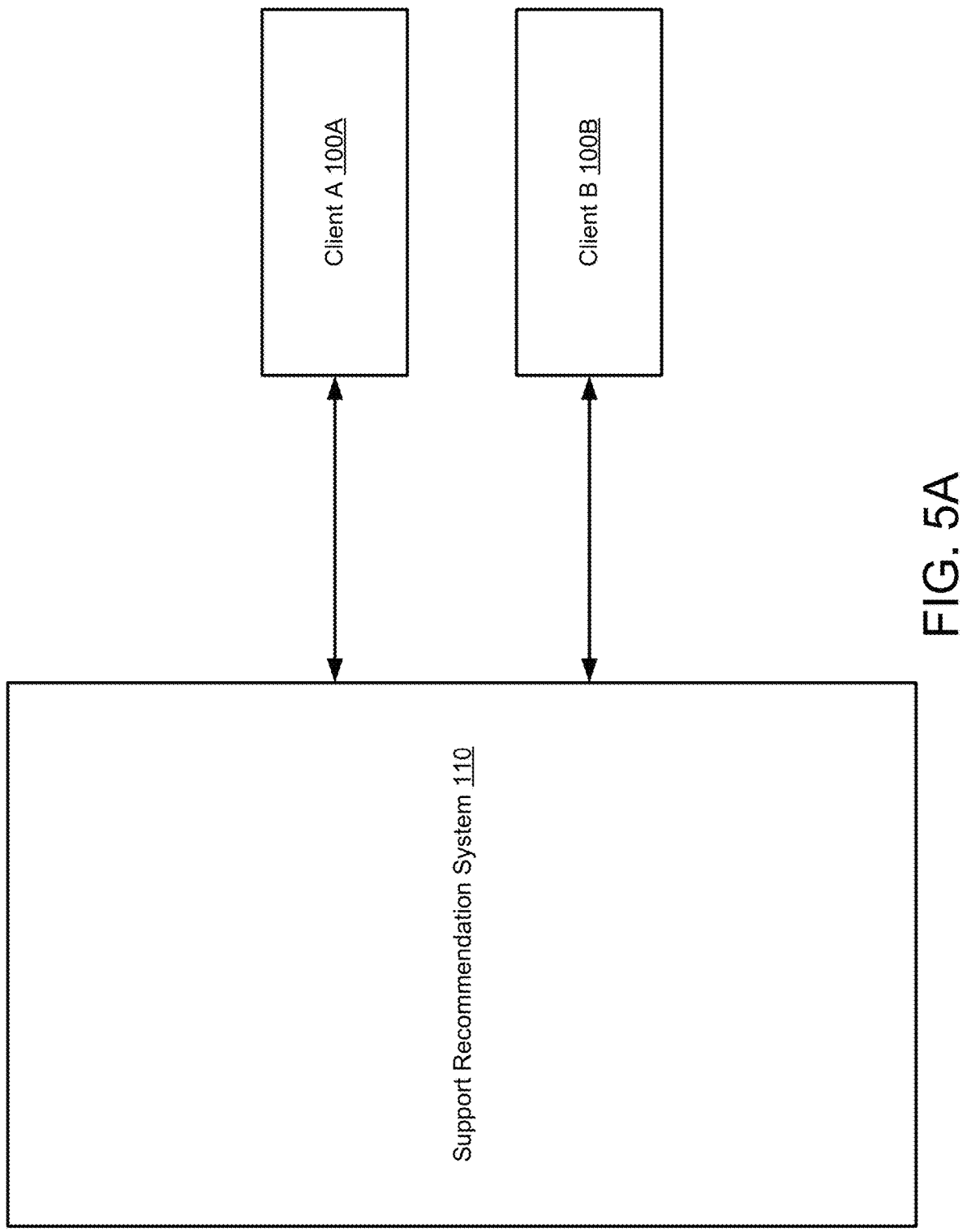
FIGS. 5A-5E show diagrams of the operation of an example system over time in accordance with one or more embodiments of the invention.
Figure 5B:
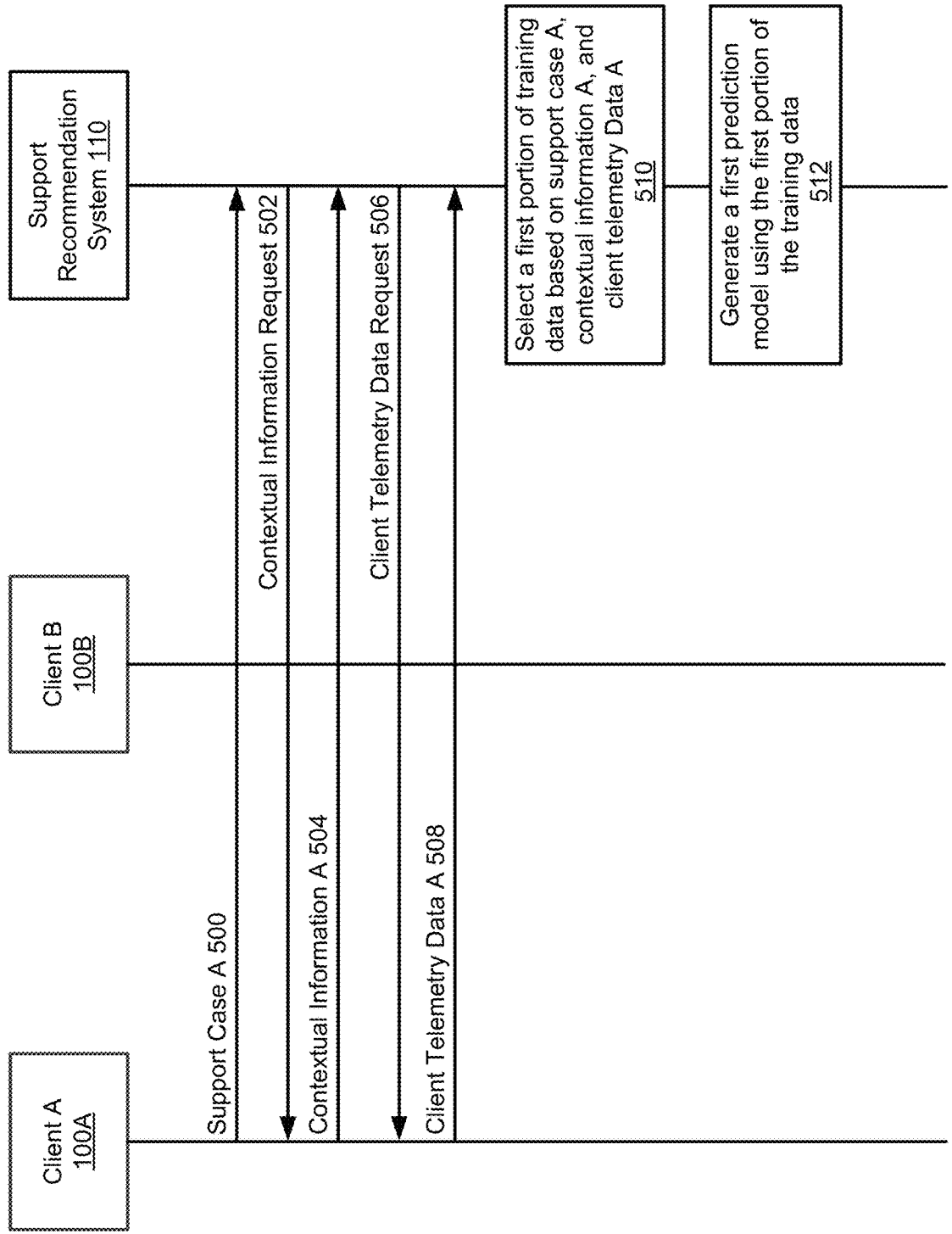
Figure 5C:
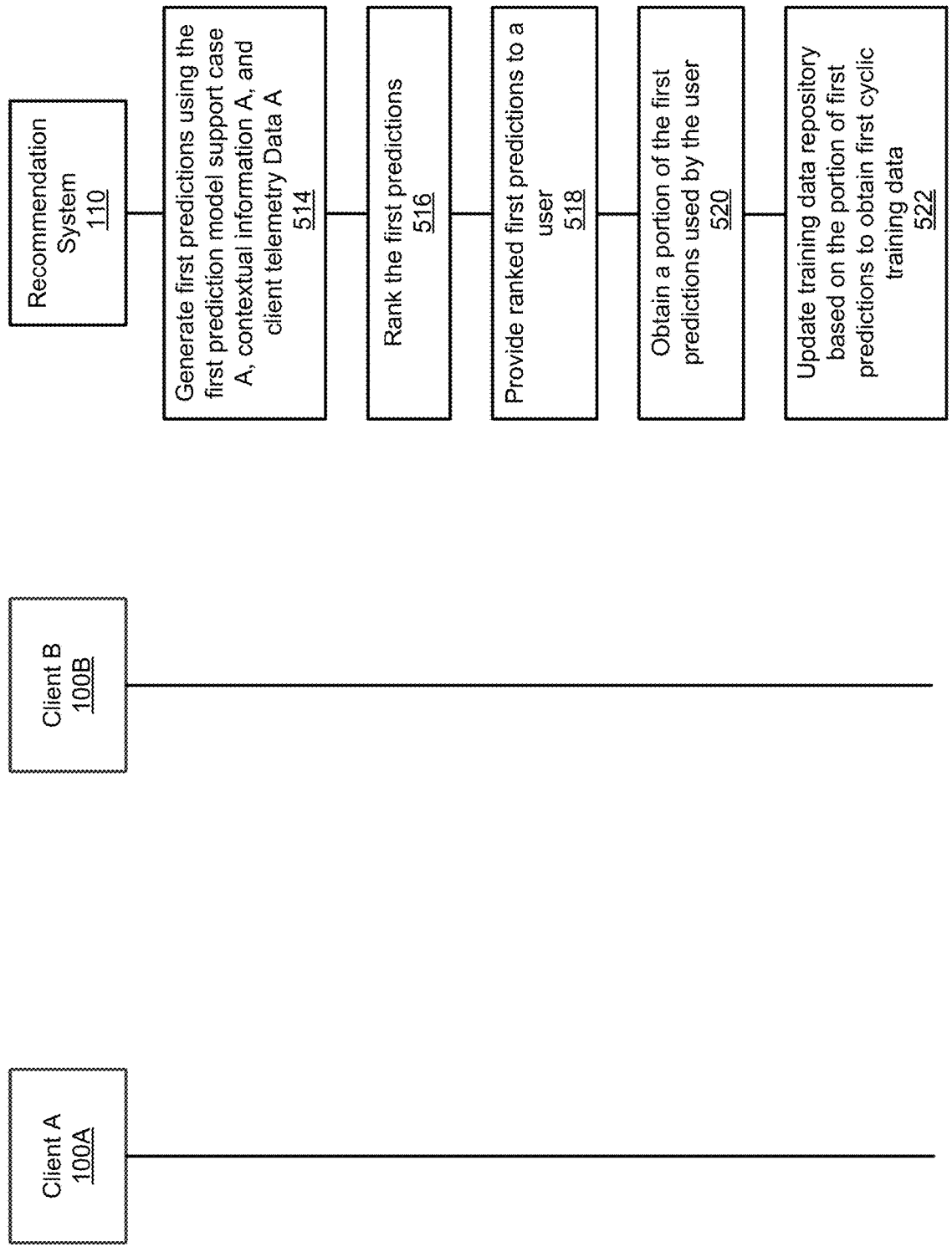
Figure 5D:
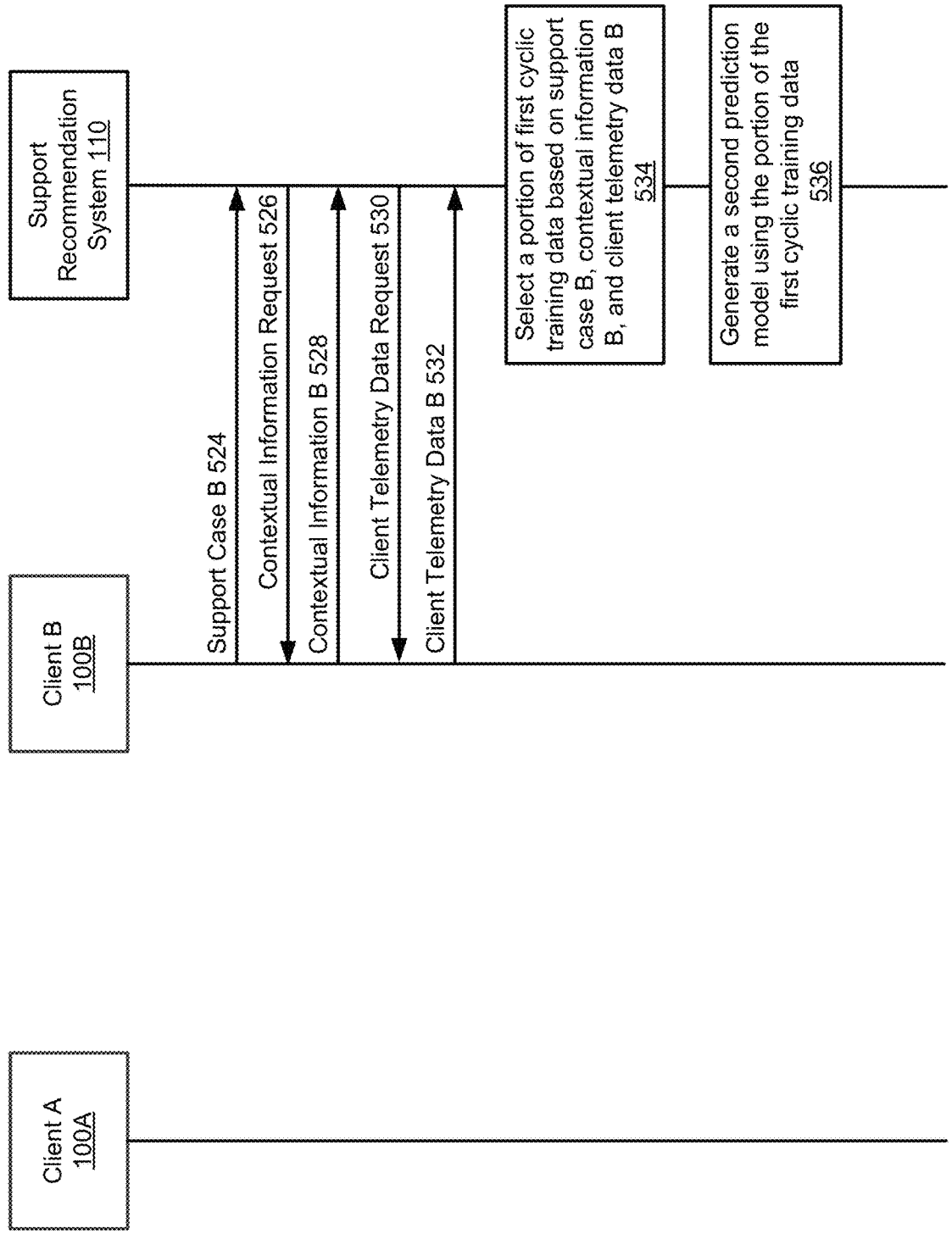
Figure 5E:
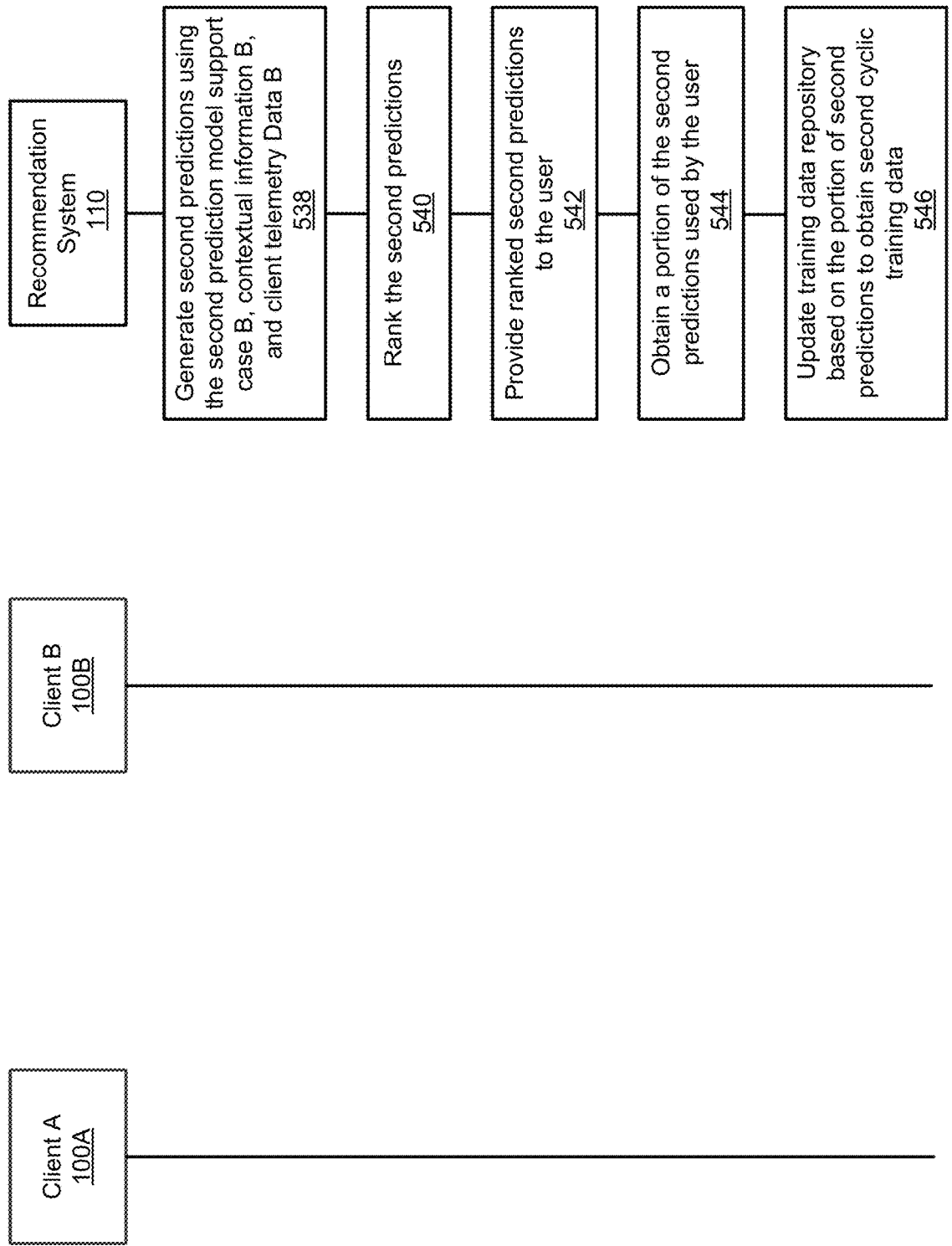

To further clarify aspects of embodiments of the invention, a non-limiting example is provided in FIGS. 5A-5E. FIG. 5A shows a diagram of an example system, FIGS. 5B-5D shows diagrams of actions that may be performed by the example system of FIG. 5A, and FIG. 5E shows a diagram of an example data structure used to perform the aforementioned actions. The system of FIG. 5A may be similar to that of FIG. 1. For the sake of brevity, only a limited number of components of the system of FIG. 1 are illustrated in FIG. 5A.

Example

Consider a scenario as illustrated in FIG. 5A in which a recommendation system (110) is providing prediction services for two clients, client A (100A) and client B (100B).

As discussed above, other components of the recommendation system (110) are not illustrated in FIGS. 5A-5E for brevity.

To provide such prediction services, the clients (100A and 100B) (or other entities such as a manager of the clients) may request a prediction of next steps to take to resolve a support case associated with failure of the clients (100A and 100B) from the recommendation system (110). FIG. 5B shows a first interaction diagram that illustrates interactions between the recommendation system (110), client A (100A), and client B (100B).

Turing to FIG. 5B, client A (100A) sends support case A (500) to the recommendation system (110). In response to obtaining support case A (500) the recommendation system (110) sends a contextual information request (502) to client A (110A). Client A (110A) then sends contextual information A (504) to the recommendation system (110). Then the recommendation system (110) sends a client telemetry data request (506) to client A (110A). Client A (110A) then sends client telemetry data A (508) to the recommendation system (110). After obtaining contextual information A (504) and client telemetry data A (508), the recommendation system (110) selects a first portion of training data based on support case A (500), contextual information A (504), and client telemetry Data A (508) (510). The recommendation system (110) then generates a first prediction model using the first portion of the training data (512).

FIG. 5C shows a second interaction diagram that illustrates interactions between the recommendation system (110), client A (100A), and client B (100B). Turning to FIG. 5C, after the first prediction model is generated, the recommendation system (110) generates first predictions using the first prediction model support case A (500), contextual information A (504), and client telemetry Data A (508) (514). The recommendation system (110) then ranks the first predictions to obtained ranked first predictions (516). After that, the recommendation system (110) provides the ranked first predictions to a user (518). Then, the recommendation system (110) obtains a portion of the first predictions used by the user to resolve support case A (500) (520). In response to obtaining the portion of the first predictions used by the user, the recommendation system (110) updates the training data repository based on the portion of first predictions to obtain first cyclic training data (522).

FIG. 5D shows a third interaction diagram that illustrates interactions between the recommendation system (110), client A (100A), and client B (100B). Turning to FIG. 5D, after obtaining first cyclic training data, client B (100B) sends support case B (524) to the recommendation system (110). In response to obtaining support case B (524) the recommendation system (110) sends a contextual information request (526) to client B (110B). Client B (110B) then sends contextual information B (528) to the recommendation system (110). Then the recommendation system (110) sends a client telemetry data request (530) to client B (110B). Client B (110B) then sends client telemetry data B (532) to the recommendation system (110). After obtaining contextual information B (528) and client telemetry data B (532), the recommendation system (110) selects a portion of the first cyclic training data based on support case B (524), contextual information B (528), and client telemetry Data B (532) (534). The recommendation system (110) then generates a second prediction model using the portion of the first cyclic training data (536).

FIG. 5E shows a fourth interaction diagram that illustrates interactions between the recommendation system (110), client A (100A), and client B (100B). Turning to FIG. 5E, after the second prediction model is generated, the recommendation system (110) generates second predictions using the second prediction model support case B (500), contextual information B (504), and client telemetry Data B (508) (538). The recommendation system (110) then ranks the second predictions to obtained ranked second predictions (540). After that, the recommendation system (110) provides the ranked second predictions to a user (542). Then, the recommendation system (110) obtains a portion of the second predictions used by the user to resolve support case B (524) (544). In response to obtaining the portion of the second predictions used by the user, the recommendation system (110) updates the training data repository based on the portion of second predictions to obtain second cyclic training data (546).

End of Example

Figure 6:
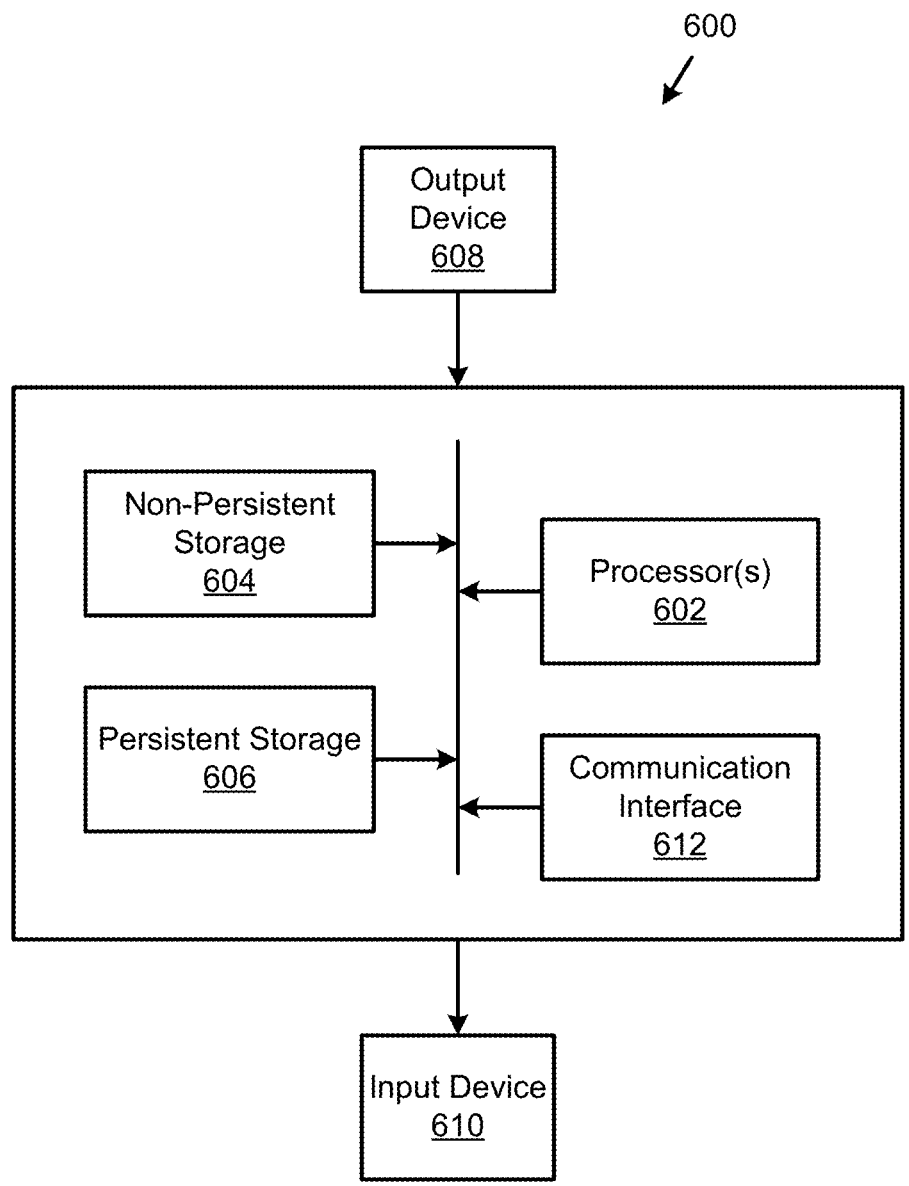
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to generating prediction that steps to take to resolve support cases associated with client component failures. To generate the predictions, a support recommendation system may identify, based on contextual information, support case information, and client telemetry data associated with a support case, a portion of training data that is the same as and/or similar to the support case. The support recommendation system may use the identified portion of the training data to generate a prediction model by inputting the portion of the training data into a classification algorithm. Therefore, the prediction model may be generated using only relevant training data associated with the support case. As a result, the prediction model may generate more accurate predictions.

The prediction model may be used to generate predictions of steps to take to resolve the support case using the contextual information, the client telemetry data and the support case information associated with the support case. The predictions may be ranked to aid users in attempts to resolve the support case. The ranked predictions are provided to users, which use the ranked predictions to resolve the support case. The users may provide the prediction that was used to successfully resolve the support case to the support recommendation system. The support recommendation system may update the training data repository to include support case information, the contextual information, the client telemetry data, and the used prediction associated with the support case to obtain cyclic training data. As a result, the cyclic training data may produce more accurate prediction models. The generated predictions may be used to efficiently resolve support cases associated with clients. By doing so, the impact of client failures on systems may be reduced.

Thus, embodiments of the invention may address the problem of inefficient use of computing resources to resolve support cases. This problem arises due to the nature of the technological environment in which the support cases are managed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing support cases associated with clients, comprising:
   obtaining, by a computing device, a support case associated with a failure of a client of the clients;
   in response to obtaining the support case:
      obtaining, by the computing device, contextual information associated with the support case, wherein the contextual information comprises:
         client component identifiers,
         client component types,
         client component performance information,
         temperature information, and
         issue severity;
      obtaining, by the computing device, client telemetry data associated with the support case;
      selecting, by the computing device, a portion of training data that is similar to the support case based on a similarity calculation between the client telemetry data, the contextual information, and the support case and the training data, wherein the training data comprises past contextual information from previous support cases of the clients, wherein the portion of the training data comprises baseline training data stored on a training data repository;

generating, by the computing device, a prediction model by executing a classification algorithm using the portion of the training data, wherein the prediction model reflects a subset of features included in the portion of the training data; and generating, by the computing device, predictions by executing the prediction model using the client telemetry data, the contextual information, and the support case, wherein generating the predictions using the client telemetry data, the contextual information, and the support case comprises:

identifying a number of times each prediction of the predictions occurs in the predictions, and ranking the predictions of the predictions based on the number of times each prediction occurs to generate ranked predictions, wherein a highest occurring prediction is ranked highest.

2. The method of claim 1, wherein the predictions comprise steps to be taken by a user to resolve the support case.

3. The method of claim 1, wherein selecting the portion of the training data comprises:

generating similarity scores between previous support cases included in the training data and the support case; and selecting the portion of the training data, wherein the portion of the training data comprises support cases associated with similarity scores above a threshold similarity score.

4. The method of claim 1, wherein generating predictions using the prediction model, the client telemetry data, the contextual information, and the support case further comprises:

generating the predictions by applying the prediction model to the client telemetry data, the contextual information, and the support case;

providing the ranked predictions to a user via a graphical user interface;

obtaining a portion of the ranked predictions, wherein the portion of the ranked predictions were used by the user to resolve the support case; and updating a cyclic training data of the training data repository to include the support case, the contextual information, the client telemetry data, and the portion of the predictions, wherein the updated cyclic training data is used to train new prediction models for new support cases.

5. The method of claim 4, wherein the portion of the ranked predictions comprise the portion of the predictions that were used by the user to resolve the support case.

6. The method of claim 4, wherein the cyclic training data comprises more data than the training data.

7. A non-transitory computer readable medium comprising computer readable program code, which when executed by a computer processor enables the computer processor to perform a method for managing support cases associated with clients, wherein the method comprising:

obtaining, by a computing device, a support case associated with a failure of a client of the clients;

in response to obtaining the support case:

obtaining, by the computing device, contextual information associated with the support case, wherein the contextual information comprises:
client component identifiers,
client component types,
client component performance information,
temperature information, and
issue severity;

obtaining, by the computing device, client telemetry data associated with the support case;

selecting, by the computing device, a portion of training data that is similar to the support case based on a similarity calculation between the client telemetry data, the contextual information, and the support case and the training data, wherein the training data comprises past contextual information from previous support cases of the clients, wherein the portion of the training data comprises baseline training data stored on a training data repository;

generating, by the computing device, a prediction model by executing a classification algorithm using the portion of the training data, wherein the prediction model reflects a subset of features included in the portion of the training data; and generating, by the computing device, predictions by executing the prediction model using the client telemetry data, the contextual information, and the support case, wherein generating the predictions using the client telemetry data, the contextual information, and the support case comprises:

identifying a number of times each prediction of the predictions occurs in the predictions, and ranking the predictions of the predictions based on the number of times each prediction occurs to generate ranked predictions, wherein a highest occurring prediction is ranked highest.

8. The non-transitory computer readable medium of claim 7, wherein the predictions comprise steps to be taken by a user to resolve the support case.

9. The non-transitory computer readable medium of claim 7, wherein selecting the portion of the training data comprises:

generating similarity scores between previous support cases included in the training data and the support case; and selecting the portion of the training data, wherein the portion of the training data comprises support cases associated with similarity scores above a threshold similarity score.

10. The non-transitory computer readable medium of claim 7, wherein generating predictions using the prediction model, the client telemetry data, the contextual information, and the support case further comprises:

generating the predictions by applying the prediction model to the client telemetry data, the contextual information, and the support case;

providing the ranked predictions to a user via a graphical user interface;

obtaining a portion of the ranked predictions, wherein the portion of the ranked predictions were used by the user to resolve the support case; and updating a cyclic training data of the training data repository to include the support case, the contextual information, the client telemetry data, and the portion of the predictions, wherein the updated cyclic training data is used to train new prediction models for new support cases.

11. The non-transitory computer readable medium of claim 10, wherein the portion of the ranked predictions comprise the portion of the predictions that were used by the user to resolve the support case.

12. The non-transitory computer readable medium of claim 10, wherein the cyclic training data comprises more data than the training data.

13. A system for managing support cases associated with clients, the system comprising:
    a persistent storage comprising a training data repository;
    a computing device, comprising a processor and memory, configured to:
        obtain a support case associated with a failure of a client of the clients;
        in response to obtaining the support case:
        obtain contextual information associated with the support case, wherein the contextual information comprises:
            client component identifiers,
            client component types,
            client component performance information,
            temperature information, and
            issue severity;
        obtain client telemetry data associated with the support case;
        select a portion of the training data that is similar to the support case based on a similarity calculation between the client telemetry data, the contextual information, and the support case and the training data, wherein the training data comprises past contextual information from previous support cases of the clients, wherein the portion of the training data comprises baseline training data stored on a training data repository;
        generate a prediction model by executing a classification algorithm using the portion of the training data, wherein the prediction model reflects a subset of features included in the portion of the training data; and
        generate predictions by executing the prediction model using the client telemetry data, the contextual information, and the support case, wherein generating the predictions using the client telemetry data, the contextual information, and the support case comprises:
            identifying a number of times each prediction of the predictions occurs in the predictions, and
            ranking the predictions of the predictions based on the number of times each prediction occurs to generate ranked predictions, wherein a highest occurring prediction is ranked highest.

14. The system of claim 13, wherein the predictions comprise steps to be taken by a user to resolve the support case.

15. The system of claim 13, wherein selecting the portion of the training data comprises:
    generating similarity scores between previous support cases included in the training data and the support case; and
    selecting the portion of the training data, wherein the portion of the training data comprises support cases associated with similarity scores above a threshold similarity score.

16. The system of claim 13, wherein generating predictions using the prediction model, the client telemetry data, the contextual information, and the support case comprises:
    generating the predictions by applying the prediction model to the client telemetry data, the contextual information, and the support case;
    providing the ranked predictions to a user via a graphical user interface;
    obtaining a portion of the ranked predictions, wherein the portion of the ranked predictions were used by the user to resolve the support case; and
    updating a cyclic training data of the training data repository to include the support case, the contextual information, the client telemetry data, and the portion of the predictions, wherein the updated cyclic training data is used to train new prediction models for new support cases.

17. The system of claim 16, wherein the portion of the ranked predictions comprise the portion of the predictions that were used by the user to resolve the support case.

18. The system of claim 16, wherein the cyclic training data comprises more data than the training data.

* * * * *